(12) United States Patent
Frohwein et al.

(10) Patent No.: US 11,900,475 B1
(45) Date of Patent: Feb. 13, 2024

(54) SYSTEM TO AUTOMATICALLY CATEGORIZE

(71) Applicant: American Express Kabbage Inc., Atlanta, GA (US)

(72) Inventors: Robert Frohwein, Atlanta, GA (US); Benjamin Cowen, New York, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 17/586,637

(22) Filed: Jan. 27, 2022

Related U.S. Application Data

(63) Continuation of application No. 16/041,095, filed on Jul. 20, 2018, now Pat. No. 11,250,517.

(60) Provisional application No. 62/534,839, filed on Jul. 20, 2017.

(51) Int. Cl.
*G06Q 40/12* (2023.01)
*G06N 3/08* (2023.01)

(52) U.S. Cl.
CPC .............. *G06Q 40/12* (2013.12); *G06N 3/08* (2013.01)

(58) Field of Classification Search
CPC .................................. G06Q 40/12; G06N 3/08
See application file for complete search history.

(56) References Cited

U.S. PATENT DOCUMENTS

| | | | |
|---|---|---|---|
| 7,690,564 B2 * | 4/2010 | Rane | G06Q 30/02 235/375 |
| 8,095,436 B1 * | 1/2012 | Shah | G06Q 40/02 705/30 |
| 8,571,919 B2 * | 10/2013 | Rane | G06F 16/285 705/7.33 |
| 8,660,945 B1 * | 2/2014 | Pariante | G06Q 20/04 705/39 |
| 8,781,881 B2 * | 7/2014 | Olives | G06Q 30/0201 705/7.38 |
| 9,311,423 B1 * | 4/2016 | Brown | G06F 16/285 |
| 9,342,793 B2 * | 5/2016 | Williamson | G06N 20/00 |
| 10,152,754 B2 * | 12/2018 | Marshall | G06Q 40/03 |
| 10,242,019 B1 * | 3/2019 | Shan | G06N 7/01 |
| 10,509,997 B1 * | 12/2019 | Gupta | G06Q 10/00 |

(Continued)

FOREIGN PATENT DOCUMENTS

| | | | | |
|---|---|---|---|---|
| CN | 105975987 A | * | 9/2016 | |
| CN | 106779467 A | * | 5/2017 | |
| WO | WO-2010117534 A1 | * | 10/2010 | ............... G06N 3/00 |

OTHER PUBLICATIONS

Kultur, Yiit, and Mehmet Ufuk Calayan. "Hybrid Approaches for Detecting Credit Card Fraud." Expert systems 34.2 (2017): e12191—n/a. Web. (Year: 2017).*

(Continued)

*Primary Examiner* — Ashford S Hayles
(74) *Attorney, Agent, or Firm* — Thomas Horstemeyer, LLP

(57) ABSTRACT

A machine-learning system which utilizes neural networks and other machine learning concepts to automatically categorize a stream of data. Known financial data can be analyzed and trained as part of a machine learning system. Then, a new set of a financial data for a particular user can be analyzed and automatic determinations can be made whether the user is a small business or consumer, and what industry the user is in.

20 Claims, 8 Drawing Sheets

(56) References Cited

U.S. PATENT DOCUMENTS

| | | | | |
|---|---|---|---|---|
| 10,592,980 | B1* | 3/2020 | Deng | G06Q 40/02 |
| 10,726,501 | B1* | 7/2020 | Ran | G06F 7/24 |
| 2002/0138455 | A1* | 9/2002 | Abdel-Moneim | G06N 3/02 |
| | | | | 706/15 |
| 2003/0061132 | A1* | 3/2003 | Yu, Sr. | G06Q 30/02 |
| | | | | 705/7.34 |
| 2003/0208468 | A1* | 11/2003 | McNab | G06Q 10/063 |
| 2005/0197954 | A1* | 9/2005 | Maitland | G06Q 10/0631 |
| | | | | 705/39 |
| 2005/0278220 | A1* | 12/2005 | Hahn-Carlson | G06Q 40/12 |
| | | | | 705/16 |
| 2007/0106582 | A1* | 5/2007 | Baker | G06Q 40/00 |
| | | | | 705/35 |
| 2008/0077551 | A1* | 3/2008 | Akerman | G06Q 40/00 |
| 2008/0126264 | A1* | 5/2008 | Tellefsen | G06Q 30/0283 |
| | | | | 705/400 |
| 2009/0048884 | A1* | 2/2009 | Olives | G06Q 40/00 |
| | | | | 705/40 |
| 2009/0171687 | A1* | 7/2009 | Crotty | G06Q 10/067 |
| | | | | 705/348 |
| 2009/0204496 | A1* | 8/2009 | Otto | G06N 3/126 |
| | | | | 705/14.69 |
| 2009/0204613 | A1* | 8/2009 | Muroi | G06F 21/56 |
| 2010/0023374 | A1* | 1/2010 | Berwitz | G06Q 30/02 |
| | | | | 705/14.4 |
| 2010/0306029 | A1* | 12/2010 | Jolley | G06Q 30/0201 |
| | | | | 705/7.29 |
| 2010/0306032 | A1* | 12/2010 | Jolley | G06Q 40/12 |
| | | | | 705/7.29 |
| 2011/0137760 | A1* | 6/2011 | Rudie | G06Q 40/02 |
| | | | | 705/30 |
| 2011/0178841 | A1* | 7/2011 | Rane | G06Q 30/0202 |
| | | | | 705/7.31 |
| 2012/0022945 | A1* | 1/2012 | Falkenborg | G06Q 30/0255 |
| | | | | 706/12 |
| 2012/0036029 | A1* | 2/2012 | Esplin | G06Q 20/3674 |
| | | | | 705/16 |
| 2012/0066065 | A1* | 3/2012 | Switzer | G06Q 30/0255 |
| | | | | 705/1.1 |
| 2013/0054338 | A1* | 2/2013 | Merz | G06Q 30/0224 |
| | | | | 705/14.27 |
| 2013/0151387 | A1* | 6/2013 | Ohkubo | G06Q 40/02 |
| | | | | 705/35 |
| 2013/0151388 | A1* | 6/2013 | Falkenborg | G06Q 40/02 |
| | | | | 705/35 |
| 2013/0325681 | A1* | 12/2013 | Somashekar | H04M 15/851 |
| | | | | 705/35 |
| 2014/0074762 | A1* | 3/2014 | Campbell | G06Q 40/00 |
| | | | | 706/46 |
| 2014/0122171 | A1* | 5/2014 | Larrain | G06Q 20/34 |
| | | | | 705/7.29 |
| 2014/0244317 | A1* | 8/2014 | Roberts | G06Q 40/08 |
| | | | | 705/4 |
| 2014/0358825 | A1* | 12/2014 | Phillipps | G06N 20/20 |
| | | | | 706/11 |
| 2015/0019394 | A1* | 1/2015 | Unser | G06Q 20/3224 |
| | | | | 705/35 |
| 2015/0100467 | A1* | 4/2015 | Blackhurst | G06Q 10/10 |
| | | | | 705/30 |
| 2015/0161743 | A1* | 6/2015 | Unser | G06Q 40/12 |
| | | | | 705/30 |
| 2015/0363875 | A1* | 12/2015 | Guerry | G06Q 40/03 |
| | | | | 705/38 |
| 2015/0371277 | A1* | 12/2015 | Filiz | G06Q 30/0269 |
| | | | | 705/14.66 |
| 2016/0005072 | A1* | 1/2016 | Robinson | G06Q 30/0255 |
| | | | | 705/7.29 |
| 2016/0034916 | A1* | 2/2016 | Unser | G06Q 30/0631 |
| | | | | 705/7.29 |
| 2016/0104252 | A1 | 4/2016 | Simpson et al. | |
| 2016/0125317 | A1* | 5/2016 | Benjamin | G06Q 30/02 |
| | | | | 706/12 |
| 2016/0180339 | A1* | 6/2016 | Zhao | G06Q 20/405 |
| | | | | 705/44 |
| 2016/0239857 | A1* | 8/2016 | Milton | G06Q 30/0201 |
| 2016/0260104 | A1* | 9/2016 | Iannace | G06Q 30/0205 |
| 2016/0350674 | A1* | 12/2016 | Midboe | H04L 67/63 |
| 2017/0004518 | A1* | 1/2017 | Moreau, Jr. | G06Q 30/0204 |
| 2017/0061343 | A1* | 3/2017 | Han | G06Q 10/067 |
| 2017/0116621 | A1* | 4/2017 | Gerard | G06Q 30/0202 |
| 2017/0154336 | A1* | 6/2017 | Marshall | G06Q 30/0201 |
| 2017/0161842 | A1* | 6/2017 | Marshall | G06Q 40/12 |
| 2017/0177995 | A1* | 6/2017 | Hillar | G06N 3/08 |
| 2017/0213223 | A1* | 7/2017 | Batra | G06F 16/26 |
| 2017/0308972 | A1* | 10/2017 | Atkins | G06Q 30/0269 |
| 2018/0027092 | A1* | 1/2018 | Foged | G06N 3/08 |
| | | | | 706/12 |
| 2018/0121533 | A1* | 5/2018 | Magnani | G06N 3/045 |
| 2018/0336457 | A1* | 11/2018 | Pal | G06N 3/045 |
| 2020/0349590 | A1 | 11/2020 | Benjamin | |
| 2023/0031874 | A1* | 2/2023 | Goldfield | G06Q 40/12 |

OTHER PUBLICATIONS

Seeja, K. R., and Masoumeh Zareapoor. "FraudMiner: A Novel Credit Card Fraud Detection Model Based on Frequent Itemset Mining." TheScientificWorld 2014 (2014): 252797-10. Web. (Year: 2014).*

Sousa, Marcos de Moraes, and Reginaldo Santana Figueiredo. "Credit Analysis Using Data Mining: Application in the Case of a Credit Union." Revista de gestão da tecnologia e sistemas de informação 11.2 (2014): 379-396. Web. (Year: 2014).*

Yu, Lean. "Credit Risk Evaluation with a Least Squares Fuzzy Support Vector Machines Classifier." Discrete dynamics in nature and society 2014 (2014): 1-9. Web. (Year: 2014).*

Kim, Sunghun, E. James Whitehead, and Yi Zhang. "Classifying Software Changes: Clean or Buggy?" IEEE transactions on software engineering 34.2 (2008): 181-196. Web. (Year: 2008).

* cited by examiner

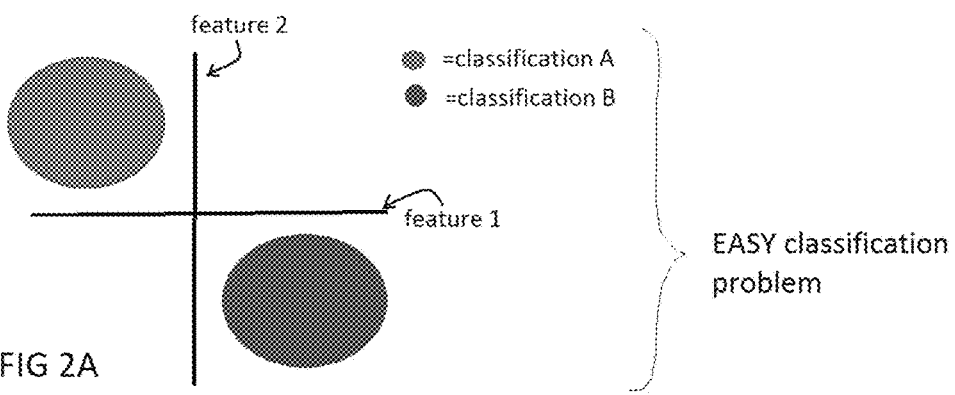
FIG 2A — EASY classification problem
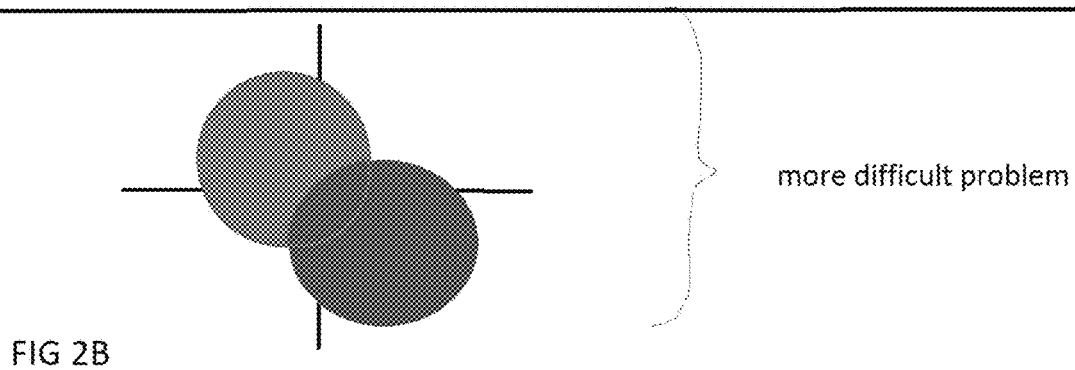
FIG 2B — more difficult problem
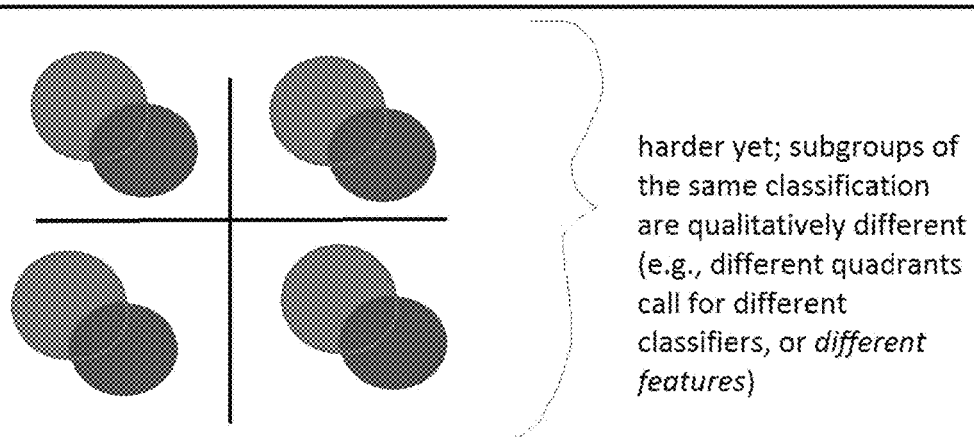
FIG 2C — harder yet; subgroups of the same classification are qualitatively different (e.g., different quadrants call for different classifiers, or *different features*)

FIGURE 3
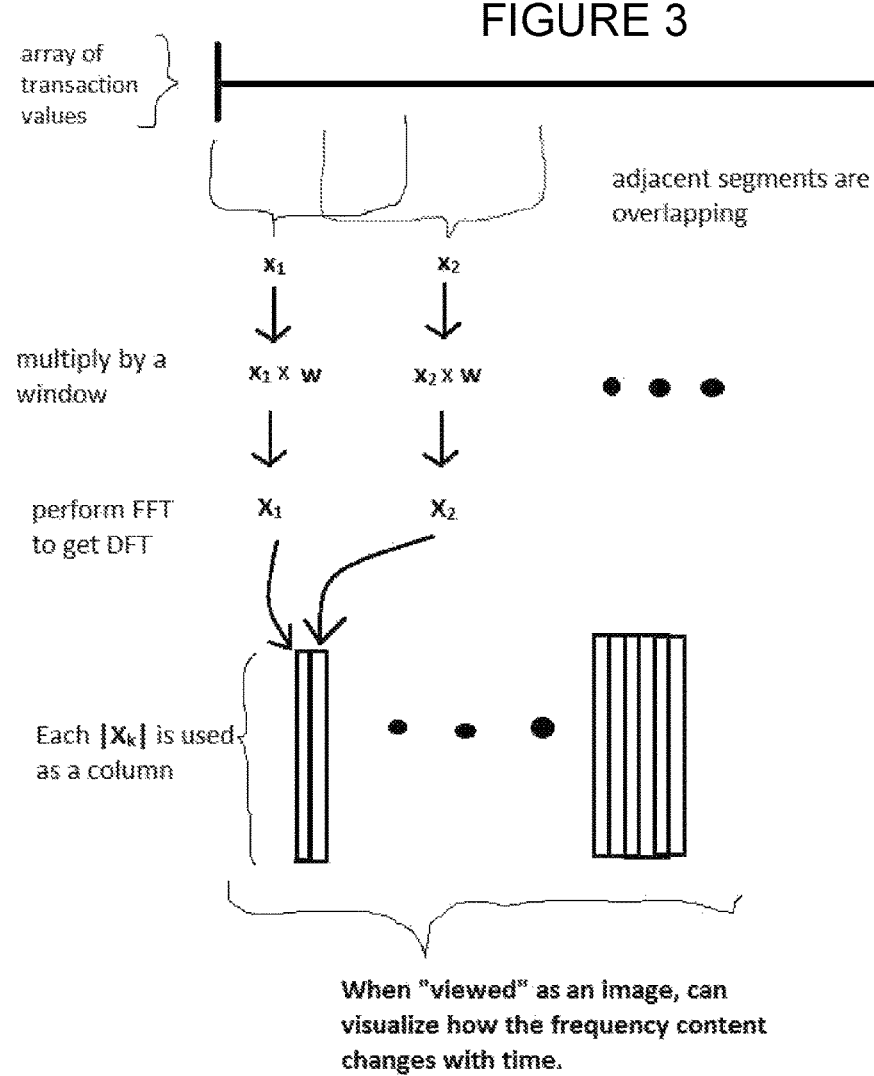
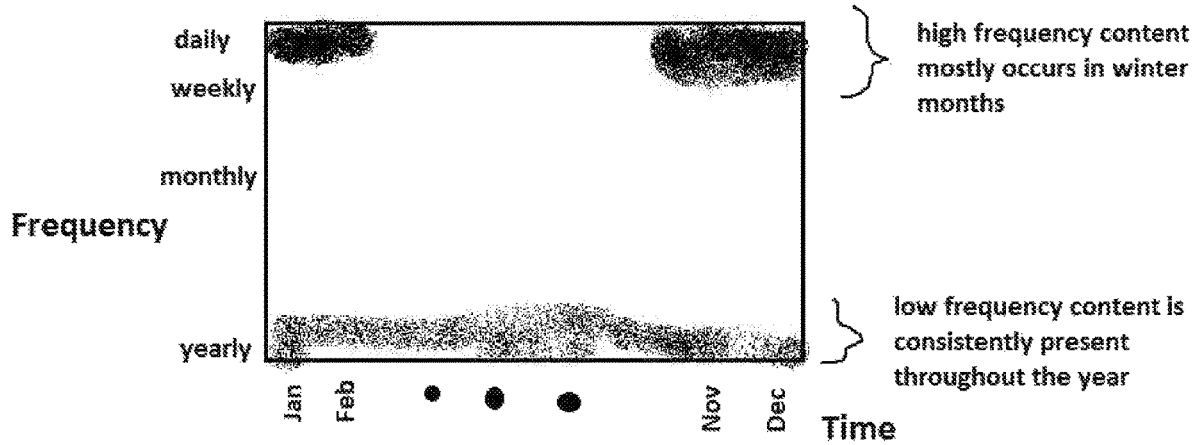

Hello John Smith
We have analyzed your transaction history and determined that you are:

1) a small business
2) a home improvement company

If #1 is wrong and you are an individual CLICK HERE
if #2 is wrong, type in correct industry here:_____

SYSTEM TO AUTOMATICALLY CATEGORIZE

CROSS REFERENCE TO RELATED APPLICATIONS

This continuation application claims priority to, and the benefit of U.S. Pat. No. 11,250,517, entitled "System to Automatically Categorize" and issued on Feb. 15, 2022, which claims priority to, and the benefit of, U.S. provisional application 62/534,839, entitled "SYSTEM TO AUTOMATICALLY CATEGORIZE PARTICULAR ITEMS." which was filed on Jul. 20, 2017, each of which are hereby incorporated by reference in their entirety

BACKGROUND OF THE INVENTION

Field of the Invention

The present general inventive concept is directed to a method, apparatus, and computer readable storage medium directed to review a list of entries and automatically determine a category of each of those entries.

Description of the Related Art

Machine learning is a current technological field with the potential to solve complex problems more quickly and accurately than human beings. See for example, "A Large Dimensional Analysis of Least Squares Support Vector Machines", by Liao Zhenyu and Couillet Romain. Available for free at arXiv.org: 1 701.02967v1 [stat.ML] (11 Jan. 2017).

SUMMARY OF THE INVENTION

It is an aspect of the present invention to provide an improved system to analyze financial transactions.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 2A is a drawing illustrating an easy classification problem, according to an embodiment;

FIG. 2B is a drawing illustrating a more difficult classification problem, according to an embodiment;

FIG. 2C is drawing illustrating a harder classification problem, according to an embodiment;

FIG. 3 is a drawing illustrating how the present frequencies vary with time, according to an embodiment;

FIG. 7 is an example output illustrating prompting a new user whether determined classifications are correct.

DESCRIPTION OF THE PREFERRED EMBODIMENTS

Figure 1:
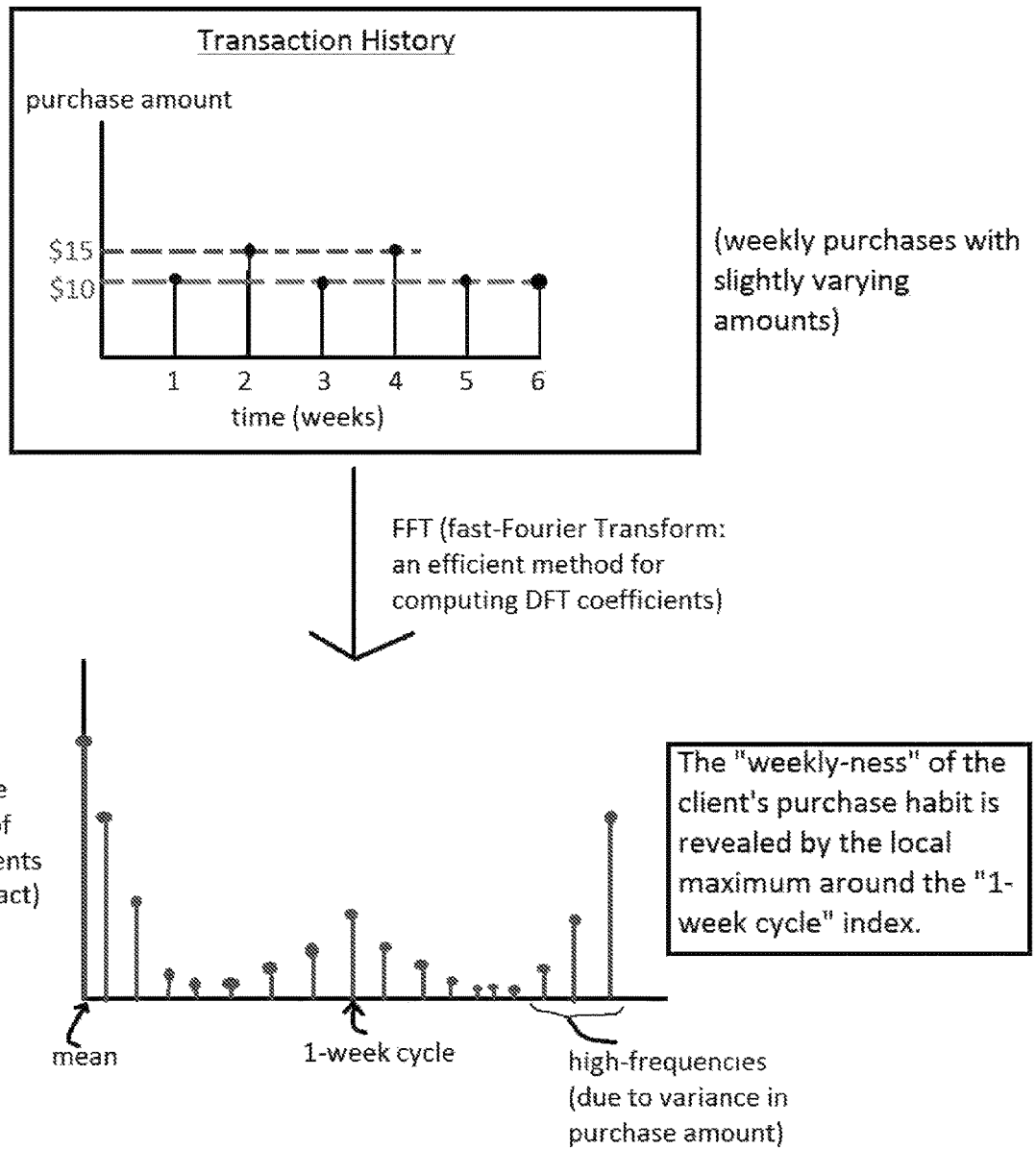
FIG. 1 is a drawing illustrating of how regular purchases can be viewed in the frequency domain.

Reference will now be made in detail to the presently preferred embodiments of the invention, examples of which are illustrated in the accompanying drawings, wherein like reference numerals refer to like elements throughout.

The present inventive concept relates to a method, apparatus, and computer readable storage to utilize machine learning (artificial intelligence) to automatically categorize transactions. There are at least two types of categorizations that can be made. The first is to determine whether an account at a financial entity (e.g., a bank, lender, payment processor, etc.) is owned by a small business or an individual a second type of automatic categorization is to determine what industry the owner is in (e.g., a baker, construction worker, etc.) The financial entity has access to a customer's bank account (or other financial account, such as PAYPAL account, credit card account, etc.) All of the transactions in this account can be automatically stored in a database. Table I below illustrates one example of possible financial data for a two month period.

TABLE I

| Date | Description | Debit | Credit | Balance |
| --- | --- | --- | --- | --- |
| Jan. 1, 2017 | start balance | | | $25,403.75 |
| Jan. 2, 2017 | Target ® | $15.87 | | $25,387.88 |
| Jan. 3, 2017 | Home Depot ® | $19.05 | | $25,368.83 |
| Jan. 5, 2017 | ACME ® Gas | $34.05 | | $25,334.78 |
| Jan. 7, 2017 | Home Depot ® | $60.45 | | $25,274.33 |
| Jan. 10, 2017 | Fishy Seafood | $14.56 | | $25,259.77 |
| Jan. 10, 2017 | Red Cross Health Ins. Co. | $18.87 | | $25,240.90 |
| Jan. 11, 2017 | Visa ® Payment, Joe Green | | $585.00 | $25,825.90 |
| Jan. 14, 2017 | Lowe's ® Home Improvement | $125.87 | | $25,700.03 |
| Feb. 1, 2017 | ACME ® Gas | $34.70 | | $25,665.33 |
| Feb. 10, 2017 | Red Cross Health Ins. Co. | $18.87 | | $25,646.46 |
| Feb. 13, 2017 | 7-11 ® | $13.24 | | $25,633.22 |
| Feb. 14, 2017 | YAYA sandwich mart | $5.03 | | $25,628.19 |
| Feb. 19, 2017 | Home Depot ® | $12.45 | | $25,615.74 |
| Feb. 23, 2017 | Ace Hardware ® | $7.75 | | $25,607.99 |

From the data illustrated in Table I, a number of assumptions can be made. First, with regard to discerning between an individual and a small business account, an automated review of this data would conclude that this account was more likely owned by a small business than an individual. The following factors are used when making this prediction: there are two charges (at around the same day of the month) for "Red Cross Health Ins Co." which is likely a health insurance plan, thus this entity is paying for their own health insurance; there is a visa payment into this account meaning that this entity accepts credit cards directly into this account (which would likely be a payment for services); there is a sizable balance in this account which is higher than what an average individual bank account would contain. Thus, evaluating all of these factors it is more likely that this account is held by a small business than an individual. Note that this is just one example of using two months of data, but typically the amount of data available would be greater than two months.

With regard to the prediction of what type of industry this account holder is in, it can be predicted that this account holder is probably in the construction business. This can be predicted based upon the following clues: that there are numerous charges from Lowes, Home Depot, and Ace Hardware, all stores which sell home improvement supplies. Of course, data from a longer period of time would be examined.

The automated predictions are merely predictions, and the user (owner of the account) once being presented with the predictions would typically confirm the predictions. If any of the predictions are incorrect, the user can then enter (type in) the correct data (e.g. whether the account is an individual/small business and what industry it is in). Note that the data from all of the users of the system (and the respective categories) can be utilized the train the system to improve future predictions.

An inventive concept relates to a method for solving two automatic classification problems using only the transaction history of clients: (1) automatically classifying clients as either individuals/consumers or corporations, and (2) in the latter case, identifying the industry of the corporation. These are referred to as embodiments 1 and 2, respectively.

The procedures are based on Machine Learning (ML). Assumed is the availability of a database of transaction histories of clients that have already been classified; that is, each client has been assigned a label (consumer or corporation, and if applicable, the industry of the corporation). The goal is to engineer a classifier from this data to automatically estimate 1) the most likely label of a new client, and 2) [optional:] the certainty with which the label can automatically be applied.

An algorithm is utilized that can estimate the labels of most new clients, but also notify a human (or otherwise raise a flag) when the estimate is not particularly trustworthy.

Generally, the first step is to determine which features of the transaction histories to use for classification. There are some optional (but recommended) methods for automatically selecting the best features from a collection that briefly cover herein. This is described in the Pre-Processing section. Then the algorithm is trained using feature-label pairs—that is, numerically optimize the parameters of our algorithm using the pre-processed data. Three approaches to the problem are described in the Training section: decision trees, support vector machines, and neural networks.

In a first embodiment, one can automatically differentiate between an individual (consumer) and a small business account. "Features" of the dataset is often referred to herein. Features are structures in the data to be used for classification. For example, "the average weekly expenditure at hardware stores over the last year" is an intuitive example of a feature. Clearly, this is not sufficient for characterizing each client on its own; the goal of our strategy is to combine many features together to classify a client as a business or consumer. The effectiveness of a classifier is extremely dependent on the features employed.

The proposed features are statistical measures on (1) the dollar amounts clients have spent at various vendors, and (2) the frequencies transactions. Such statistics must be calculated separately for different types of vendors. Thus, vendor categories or vendor classes (VC's) are very important to the effectiveness of our classifier. For example, the meaning behind regular purchases at wholesale clubs is potentially very different from regularly purchasing from a steel mill.

In the Pre-Processing section, presented is a list of possible features and how to compute their numerical values. However, it's not necessary (or desirable) to use all the features all the time: some features will be redundant on some level, and could potentially encode noise into the classifier, lowering its accuracy (this phenomenon is generally known as "overfitting"). The umbrella term for combating this issue is Dimensionality Reduction, which is discussed after the list of suggested features.

The Training section herein briefly goes over some training approaches, which differ depending on the specific ML algorithm employed. Some pros and cons of different ML approaches are briefly discussed.

Pre-processing will now be discussed, starting with vendor classifications. The statistics of a client's purchases will contain varying amounts of information, depending on the type of vendor. For example, it may be impossible to distinguish an out-of-home business from a residential household given only their electricity bills. Conversely, if a client is paying $5000 each Tuesday morning to a fishery, it is more likely to be a restaurant or grocery store than an individual. The human ability to make such a distinction is a function of many variables, including frequency of purchases, amount and variation of purchases, and the type of vendor providing the goods, which provides important contextual information. This subsection is focused on establishing the latter formally.

Of course, one approach is to list all possible vendors and construct features in this manner; i.e. each individual vendor receives its own "category". However, this leads to a huge number of features; plus, vendors are constantly forming and disbanding, and such an approach is likely to accidentally encode into the ML algorithm a parochial rule: e.g. something like "businesses tend to buy directly from Farmer Johnson" instead of "businesses tend buy bulk from farmers". This is referred to as missing the forest for the trees.

The problem of automatically classifying vendors by industry is addressed in Embodiment 2, but it closely tied with the approach of Embodiment 1. For the remainder of Embodiment 1, we assume that such labels are available in the database.

From here on, suppose that the vendor categories (VC's) are organized by letter name, e.g. A, B, C, . . . without any particular order. As many categories should be included as possible, including seemingly universal ones such as utilities (unless, by some process of dimensionality reduction, a category is eliminated). Given the wide variety of transactions within each classification (rich vs. poor families; fully-funded vs. brand-new small businesses), it is unlikely that a single, or even pair, of categories will be able to accurately classify all new clients. Although that is technically possible, it shouldn't be assumed.

Next is discussed a "list of features", which propose several features based on the statistics of transaction amounts over various time-scales. A couple of important notes to consider with the list of features:

i. Each proposed feature should be computed for each VC! That is, each vendor category has some distinct statistical features. The final collection is comprised of all features for each VC (before dimensionality reduction).
  ii. A maximum time limit should be considered. For example, the meaning behind statistics of the last 5 years may be different from those over all time, e.g. 30 years. Usually use the variable M in feature equations to denote the number of days one is taking into consideration (i.e. M=365×5 versus M=365×30). If one is analyzing many decades of data, inflation weighting of some kind may be needed. E.g. an average monthly expenditure of $2000 at a lumber yard meant something different in the 80's than it will in 2050 (presumably).

What follows is a list of proposed features, to be computed separately for each vendor category:

1. Straightforward yearly totals

The total expenditure in each VC can be telling on its own. However, because anomalies in spending often occur, it might be better to stick with averages (see features 3-6).

2. $A_{N,M}$: Centered N-day average over the last M days for various N and M (this is slightly different than the "moving mean", a.k.a. running or sliding average). First, computed is a vector m whose entries represent all the N-day expenditures:

$$m_{N,j} = \sum_{i=j-n}^{j+n} p_i,$$

for each j in the interval designated by M. Denote with pi the amount purchased at time-point i, and $$n = \text{floor}\left(\frac{N-1}{2}\right).$$

If i goes out of bounds (i.e. earlier or later in time than the specified interval), we take $p_i=0$. This just means that we want the purchase amount to be centered on the $j^{th}$ time point, so we want half the contributing purchases to be before the $j^{th}$ one and half to be after. Then, if N is even, we need to round to the nearest integer (hence the floor function is used, but the ceiling or round functions could be used instead).

Computing this for all j gives us a series of values corresponding to N-day expenditures around the $j^{th}$ time point. For example, if N is 7 days, then $m_j$ represents total weekly expenditure during the week surrounding the $j^{th}$ day. Now an overall weekly average can be computed by finding the average of these values:

$$A_{N,M} = \frac{1}{M}\sum_{i=1}^{M} m_{N,i}.$$

$A_{N,M}$ is the feature under discussion.

This version of the sliding average is proposed because it is time-invariant. Without this characteristic, for example, the average weekly expenditure value will depend on when the first transaction occurred. For example, whether the client's first purchase was on the first day of becoming a client or the $2^{nd}$ is presumably a factor we want to eliminate.

Similarly, since different clients will have different transaction history lengths, the simple mean does not necessarily provide a fair comparison between clients. As long as M (or some other time-interval of length M) is consistent between clients, it is a fair comparison.

EXAMPLES i. the average weekly grocery expenditure over the last year: N=7, M=365.
ii. The average monthly grocery expenditure over the last 10 years: N=30, M=3650.
3. VA $R_1$(N, M) Variance of purchase amounts (type 1)
One type of variance can be quickly derived from $A_{N,M}$ and m as computed in the previous step:

$$VAR_1(N, M) = \sum_{i=1}^{M}(A_{N,M} - m_i)^2$$

4. Standard mean $B_{N,M}$ and variance $VAR_2$(N, M) of purchase amounts

The more intuitive, time-varying statistics are also important. Namely, weekly, monthly, and/or yearly expenses using conventional time segmentations (namely Sun-Sat, $1^{st}$ of the month, January $1^{st}$, etc.). These more standard statistics can be computed as follows:

a. The new totals vector over the last M segments:

$$v_{N,j} = \sum_{i=1}^{N} p_i, \forall i = 1, \ldots, M$$

where $p_i$ represents the purchase amount on the $i^{th}$ day of the segment during the $j^{th}$ segment. Then the average expenditure is:

$$B_{N,M} = \frac{1}{M}\sum_{i=1}^{M} v_{N,i}$$

5. And the corresponding variance is $$VAR_2(N, M) = \sum_{i=1}^{M}(B_{N,M} - v_{N,j})^2$$

Note that the formulas for $M_{N,j}$ and $V_{N,j}$ look similar, and especially those for $A_{N,M}$ and $B_{N,M}$. The key is in the distinct underlying meanings of the second index, M or j. In the latter, each week (or month, etc.) is labeled per our typical calendar understanding of time. In the former time-invariant version, computed is a weekly expenditure for each day, using data from the surrounding week (or month, etc.). These two measures are not necessarily comparable and should be considered as distinct features.

Example i. Some businesses (presumably) have highly regular purchases (supplies or materials for goods), which corresponds to having a low variance.
ii. Some businesses (presumably) have higher mean and total purchase amounts than consumers; e.g. spending $30000/year on computer supplies with low variance.
6. Mean time between purchases—As suggested in Example 10a, one might guess that certain businesses make more precisely regular purchases than average consumers (although that may be changing [or downright false] thanks to the rising dominance of internet-based subscription services . . . ). Nevertheless, an interesting set of features can be pulled from the times between purchases in each vendor class as follows.

Suppose that a client's first two purchases in vendor class A occur on days $n_1$ and $n_2$, respectively. Then the first time-between-purchases is $$t_1 = n_2 - n_1$$

(the number of days between purchases).

Suppose that the next ($3^{rd}$) purchase occurs on day $n_3$. Then $$t_2 = n_3 - n_2.$$

Continuing in this way gives us a vector $t=[t_1, \ldots, t_{M-1}]$, where M is the total number of purchases in the current vendor class (in the given amount of time under consideration). Statistics on t should be considered for features, namely the mean and variance:

$$t_{mean} = \frac{1}{M-1} \sum_{i=1}^{M-1} t_i$$

7. Variance of time between purchases $$VAR_3(t) = \sum_{i=1}^{M-1} (t_{mean} - t_i)^2$$

8. Coefficients of Variation (COV)

In 3, 5, and 7, suggested are three conceptions of variances found in the transaction signals. These measures are scale-variant. That basically means that the total amounts being spent are correlated with the magnitude of the variance (so wealthier clients are bound to have higher variance than less-wealthy). A normalized coefficient of variation (COV) may be considered for any/all of the proposed variance measures. This is defined as $$COV(x) = \frac{\sqrt{VAR(x)}}{x_{mean}},$$

i.e., the variance in question is divided by the mean of the corresponding variable. This dimensionless statistic makes the variance of one client's expenditure more comparable to those of others, regardless of base wealth.

Frequency Analysis—The Discrete Fourier Transform (DFT) is a very well-known transformation. DFT coefficients provide a representation of time-varying data (such as transaction history) in terms of its underlying frequencies; they are usually computed using the fast-Fourier Transform (FFT). The DFT of a transaction history is referred to herein as the frequency-representation of it, while the FFT is a simply a method of acquiring the DFT.

For example, a consistent weekly purchase will result in a DFT representation with energy around the coefficient representing 1-week cycles. I.e., the client's transaction history has a component of oscillation with a period of about 1-week; the DFT explicitly reveals such components.

See FIG. 1 for a rough illustration of how regular purchases can be viewed in the frequency domain. As can be seen in the bottom panel, the transformation is not trivial to understand. DFT coefficients are complex, so we will only deal with the absolute value (or magnitude) of the complex values. The 0-th DFT coefficient (the "DC" component) is proportional to the mean value of the signal, so the mean should be subtracted from the signal before applying the FFT. Similarly, some high frequencies will be present due to variations in purchasing amount, which may have a higher magnitude than the value of interest (the coefficient that implies weekly purchases in the middle). We will refer to a local maximum (there are three in the bottom panel of FIG. 1) as peaks.

Notation: Let $x=[x_1, \ldots, x_M]$, i.e. denoted is a vector x as a string of M transaction values, with each component denoted by a subscript. Let capital letter X denote the corresponding vector of DFT coefficients from x.

9. Indices of the maximum absolute value DFT coefficient peaks

Define a peak as a value that is higher than its adjacent values, i.e. $x_n$ is a peak if $$(x_n > x_{n-1}) \text{ AND } (x_n > x_{n+1}).$$

To collect interesting peaks from X, we first subtract the mean from each transaction value in x:

$$x_{mean} = \frac{1}{M} \sum_i x_i$$

$$\hat{x} = [x_1 - x_{mean}, x_2 - x_{mean}, \ldots, x_M - x_{mean}].$$

Then, compute the DFT of x, and take the absolute value:

$$\hat{X} = |FFT(\hat{x})|.$$

The indices of first few largest peaks of $\hat{X}$ should be considered as features. In other words: where the peaks occurred is (potentially) more important than the actual magnitude of the DFT coefficient at that index.

Note that the raw DFT coefficient index depends on the length of the transaction history under consideration. So, a normalization must be applied to indices so they are directly comparable across clients. For example, translate all DFT coefficient indices to represent cycles per day (OR week, etc.).

10. Band-specific peaks—Additionally, one can consider peak values restricted to different "bands" of frequencies. For example, one feature is set to the maximum peak value(s) found in the 0-2-week frequency band (excluding the 0-th component); the peaks found in the 2-5-week frequency band may be a distinct feature; etc.

11. Total Energy in a band

Further, one can consider the total energy within each segmented frequency band. The energy in a frequency band between the coefficients $k_1$ and $k_2$ is given by $$E(k_1, k_2) = \sum_{k=k_1}^{k_2} \hat{X}_k^2,$$

where $\hat{X}_k$ are magnitude-DFT coefficients.

12. Band-energy ratios The ratio between the total energy and the energy found in each band should also be a feature for each vendor class.

Example a. Some individuals/consumers are more likely to spend a large portion of their income on nearly-daily spontaneous purchases (whereas, for certain businesses, a larger proportion of their net expenditure may occur on supplies or materials at regular weekly, monthly, or yearly intervals [not daily]).
   b. an opposite example from 12a would be a sushi restaurant that buys fresh fish every single morning. Then most of its expenditures will be in the frequency band around "daily" purchase cycles.
13. Normalized Frequency peaks The amount of money spent impacts the DFT coefficients. I.e. if two clients have precisely the same purchasing schedule, but one spends 100× more per transaction, they will have unique DFT coefficients. Therefore, it may be desirable to normalize transaction amounts (for example, every time the client spends over a threshold E, set a value of 1). This should not replace any previous DFT peak analyses because a lot of information will be lost or obscured by thresholding purchases—but it could complement them as distinct features. Various E values should be used ($10, $100, $10000, etc.).
14. Seasonal spending frequencies—An interesting set of features may arise from considering how the frequencies of purchases vary with time of the year. This information can be automatically analyzed via the Short-Time Fourier Transform (STFT) representation of clients' transaction histories.

The STFT is highly related to the DFT. The STFT is obtained by computing the DFT of many short segments of the transaction history. For example, consider a transaction history that is one year long. By computing the DFT of the values (x), one can analyze which frequencies were present during that year. Suppose that there is a large-magnitude value in the coefficient for daily purchasing. The question arises: did the client purchase on a daily basis for the entire year, or just a portion of the year? One way to answer that question is by computing the DFT of each month; viewing these side-by-side can reveal how the present frequencies vary with time. This is the basic idea of the STFT (in practice one can use overlapping and windowed segments of data). See FIG. 3 for a rough illustration.

We will denote the STFT of x with $X_{i,j}$ (being two-dimensional, it has an index for both row and column [frequency and time, respectively]). As before, it is recommended to subtract the mean $x_{mean}$ from each transaction value before computing its STFT.

Various features can be constructed from STFT coefficients:
   a. 2D Band-Energies—Divide the STFT "image" into time and frequency bands, giving 2D rectangular arrays of STFT coefficients. The energy in a band ranging from times $t_1$ to $t_2$ and DFT coefficients $k_1$ to $k_2$ is given by $$E_2(t_1, t_2, k_1, k_2) = \sum_{k=k_1}^{k_2} \sum_{t=t_1}^{t_2} |X_{k,t}|^2$$

b. 2D Band-Energy Ratios—The ratio between the total energy and the energy found in each band can yield a set of features.
   c. Mean of Column Peaks—Using methods discussed in Features 9-10, one can compute the indices of interesting peaks from each column of the STFT. This yields an array of indices $$k = [k_1, k_2, \ldots, k_M]$$

where M is the number of columns and $k_i$ is the index of the maximum value of the $i^{th}$ column. The mean of this array $$k_{mean} = \frac{1}{M} \sum_{i=1}^{M} k_i$$

may be a relevant feature.
   d. Variance of Column Peaks Other statistics on k may be of interest, such as the variance:

$$VAR_4(k) = \sum_{i=1}^{M} (k_{mean} - k_i)^2$$

Similarly as in Feature 8, this can be "normalized" by dividing by $k_{mean}$:

$$COV_4(k) = \frac{VAR_4(k)}{k_{mean}}$$

Example: i. The intuition behind $VAR_4$ and $COV_4$ is sort of a mouthful: they measure the spread (how much variation is present) in the maximum frequencies detected over time. For example, a certain type of consumer probably makes mostly sporadic purchases. Thus, there will be very little consistency in the frequencies of their transactions, leading to a high variance.

Note that Features 14c and 14d can also be computed when in terms of frequency bands, like Feature 11 (but for each column). Also note that there is almost guaranteed to be some redundancy between the energy distributions of STFT and DFT coefficients.

Features Involving Data from Multiple Vendor Classes (VC)—
  15. Proportion of expenditure spent in each month/season—Computing the proportion (and/or pure total amounts) of the client's total income (or total expenditure) spent in each time-band may be an interesting set of features. I.e., time-bands could be in terms of monthly, quarterly, seasonal, etc. lengths of time.
  16. Proportion of income to expenditure in each vendor class—Like the previous feature, the proportion (and/or pure totals) of the client's total income (or total expenditure) spent in each VC may be telling (especially when determining the VC for a business client).
  17. Ratios of VC expenditures In Features 15 and 16, compared is VC expenditure to the client's total purchasing capacity. Another interesting set of comparisons is the amount purchased between VC's.

Let A, B, C, . . . denote the amount spent in vendor category A, B, C, etc. Suppose there are M categories. Then the list of ratios is as follows:

$$\frac{A}{B}, \frac{A}{C}, \frac{A}{D}, \cdots \frac{A}{M}, \frac{B}{C}, \frac{B}{D}, \frac{B}{E}, \cdots \frac{M-1}{M}.$$

Writing the list in shorthand as above is one thing, but the number of possible combinations is $$M! = M \times (M-1) \times (M-2) \times \ldots \times 3 \times 2 \times 1.$$

If M=7, there are already over 5000 such ratios. Therefore, it is prudent to think of some particularly interesting ratios to consider instead of trying them all!

Examples: a. The ratio given by (amount spent on utilities)/(amount spent on groceries) is a simple example of such a feature. For individuals, the amount spent on groceries probably varies somewhat linearly with utilities (wealthier families, indicated by more expensive utilities, buying fancier groceries). However, a business probably pays much more for utilities without spending much on groceries at all. Thus, a high ratio might be a good indicator for certain businesses.

3.—Dimensionality Reduction—There is absolutely certain to be redundancy in the above list of features, plus any that the implementer might add. There are multiple approaches to reducing the list of features to only [combinations of] those which are most important. This is generally referred to as dimensionality reduction. Suggested is employing some or all the following dimensionality reduction approaches:

1. Feature Extraction builds a new set of features from a given set with the goal of eliminating redundancy between given features.

Example a. One approach is to assume some combinations of feature values may yield higher accuracy than the original features. For example, perhaps the sum of all utility expenses is equally or more predictive than any utility expense by itself. This could reduce, say, four features (yearly average on water, electric, gas, internet) to just one (yearly average on all utilities).

To continue the example, perhaps weekly, monthly, and yearly averages we all computed as features. It may turn out that the yearly average is just as predictive (or more) than using all three. Eliminating the first two is feature selection.

2. Feature selection or local feature selection is the idea of pruning one's list of features to only the most important ones. For example, automatically detecting and throwing out features which only introduce noise into the classifier. Local Feature Selection (LFS) is highly recommended for this application, since it is extremely high-dimensional and the members of each classification are highly variable. LFS assumes that different features are more important in different areas of the distribution of examples.

In LFS, the implementer must select exemplary clients for different regions of each class (e.g. wealthy, bankrupt, middle-ground, small, big, etc. businesses; wealthy, middle-ground, poor, single, large-family, etc. consumers). Then, when classifying a new client, the first step is to identify which exemplar that client most resembles (based on features). Each region of "client-space" (where regions are defined by the exemplars) has a distinct classifier, i.e. that has had its features pruned and algorithms trained independently.

To illustrate the idea of locally-varying features, see FIG. 2. In this reductive, two-dimensional example, there are only two possible classifications (A=red and B=blue). The axes in each panel represent a pair of features that are deemed relevant to this classification (the graph would presumably look different using a distinct pair of features).

In FIG. 2a, the two categories (A and B) are clearly separable and the chosen pair of axes do a great job of describing the categories. One can simply draw a line between the red and blue circles, then any new client can be classified by simply asking "is the client above or below the line?". This means the classes are linearly separable.

Suppose category A is "fishing businesses" and B is "sports equipment stores"; and suppose the y-axis is "boat maintenance costs" while the x-axis is "weight-lifting barbell costs". This is an easy classification and a relevant pair of features (because sports stores probably don't spend much on boat maintenance, while fisheries don't spend much on barbells). On the other hand, if the features/axes were "average sales per month" versus "total monthly expenditure on solar panels", the graph would not be illustrative at all. That is why relevant feature selection is crucial.

Now consider FIG. 2b. Most interesting/real-life classification problems are not quite linearly separable, at least not directly and with only two features (see the SVM section in Training). Therefore, an ideal classifier will estimate the confidence of its own classification. For example, if a business is determined to be in the overlapping area, but is more near the "center" of the red cluster, it might classify the client in A but also raise a flag along with its estimate, signaling a confidence of less than usual (or perhaps with a specific confidence estimate).

Finally, consider FIG. 2c. This is probably closer to what our problem looks like: disjoint subgroups of the same category are found in different regions of feature space. This is because the data is so rich: clients vary a lot within each class. For example, both consumers and home-businesses can vary greatly in the amounts and types of goods being sold, as well as from what sort of vendors they acquire materials from; not to mention they both pay "residential-like" maintenance costs. A collection of home-business data will probably not appear as a neat, closely-spaced blob in feature-space (such as in panels 2a and 2b); but probably in multiple small blobs that seemingly have no relation. The goal of a normal classifier is to link those blobs by some nonlinear transformation; the goal of LFS is to address different blobs with several mini-classifiers.

Note that the appearance of such a graph depends completely on which features are being considered; perhaps there is one that can beautifully cluster home-businesses together, without mixing up with consumers. Feature Selection and Extraction may reveal such a feature.

II. Training—Now addressed is how to incorporate a vast list of numerical values into a single classifier. (That is, after determining which features should be used using dimensionality reduction, etc.). The details of the procedure depend on which ML algorithm is used. The first general step is to compute, for each client, the feature values for each vendor class (VC). These value collections can be thought of as an array, often called a "feature vector"; each client is represented as a feature vector in the ML algorithms. The most intuitive ML approach is a decision tree, which simply encodes a (long) series of questions, narrowing down further and further what the most likely classification is based on the client's feature vector. However, decision trees are known to have some problems with continuous variables (which almost all of ours are, i.e. dollar amounts and frequencies). They also take an exceptionally long time to train for problems with many features.

Figure 4:
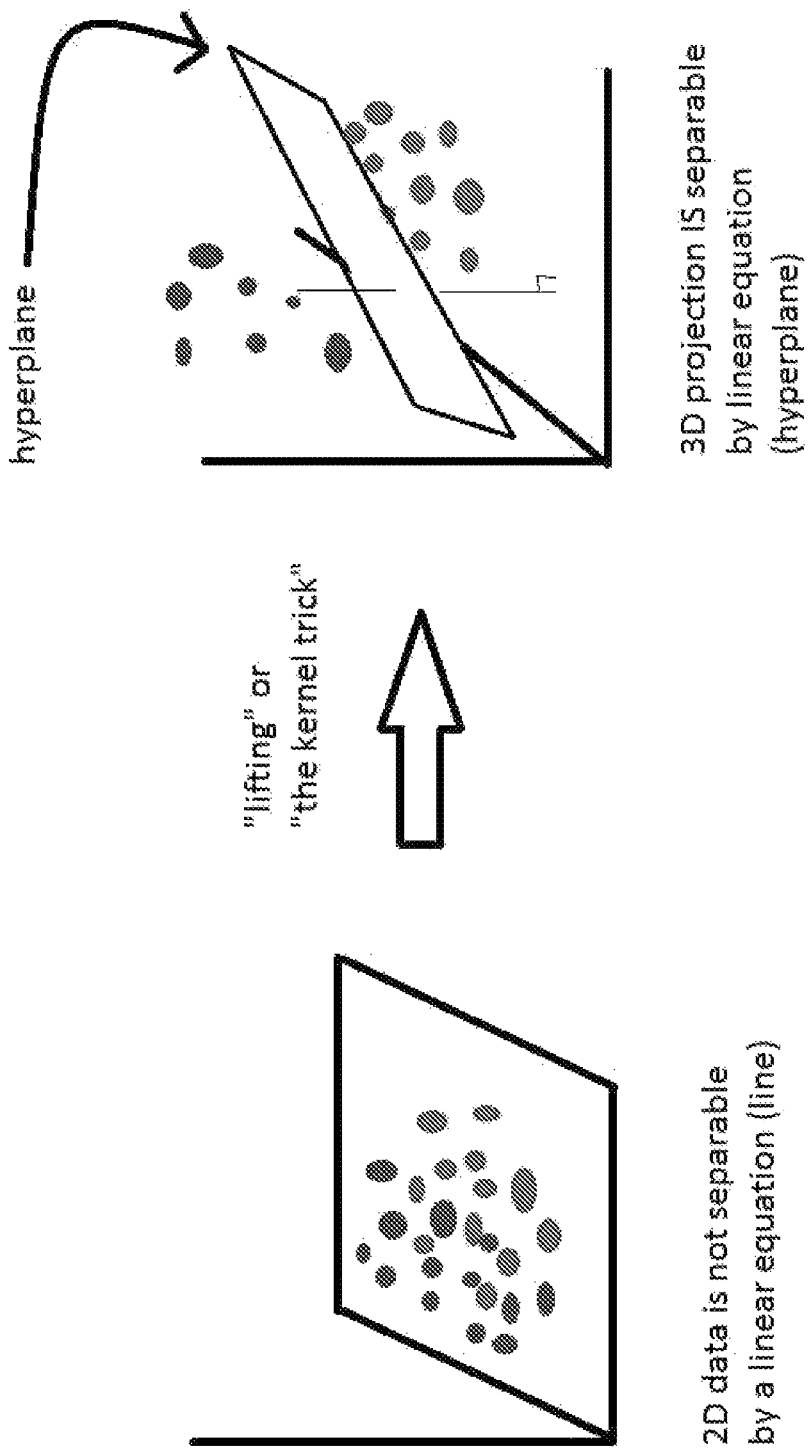
FIG. 4 is a drawing illustrating a function that warps feature space to make classification easier, according to an embodiment.

Other approaches use the numerical values of features in a more complex way. For example, the motivation behind support vector machines is to design a function that warps feature space to make classification easier; e.g. a function that transforms the axes in FIG. 2c into those of 2a. See FIG. 4.

Briefly addressed is how to incorporate transaction features into neural networks, support vector machines, and decision trees.

1. Decision Trees—Decision trees are really sets of rules: each new client is classified using these rules in the form of asking questions about their feature values. To build a decision tree, one recursively creates nodes by applying the following procedure (a node is either a question about the rules, or an endpoint at which classification occurs):
   1. If every remaining client has the same classification, or if very few clients made it here, this node is an endpoint. This endpoint is labeled with the most frequent class (and, if desired, an accuracy measurement based on the proportion of that class).
   2. Otherwise (i.e., there are many clients left and multiple classes), find the best rule for each class based on one feature, and use it to partition the remaining clients.

So, creating a decision tree starts off with a question about a particular feature. Which rule and feature is determined by brute-force tryouts for all combinations of predetermined values (i.e. a feature value between 1 and 100, 101 and 200, etc. The limits are the "rules"). The best rule-feature pair is usually determined by the one that maximizes information gain. At this point, one can see the combinatorial nature of training decision trees (trying all combinations of rules and remaining features for each node).

On the other hand, decision trees usually employ pruning to throw out unnecessary nodes, and in computing information gain etc. sort of automatically rank the features in terms of partitioning ability (which can be used for dimensionality reduction).

2. Support Vector Machines—There are a variety of types of support vector machines. In particular, the least-squares support vector machine (LS-SVM) was developed to tackle problems with huge feature vectors and many samples (clients). Highly recommended is the use of a nonlinear mapping, also known as the "kernel trick": see FIG. 4.

The idea is to transform the feature space to make it as close to that depicted in FIG. 2a as possible; that is, to put the problem in a domain where linear classification is possible. Call this nonlinear mapping $\phi$ (many such functions have been studied, as discussed below). Denote the $i^{th}$ feature vector with $x_i$ and associate it with label $y_i$, where $$y_i = \begin{cases} 1, & \text{if client } i \text{ is a consumer} \\ -1, & \text{if client } i \text{ is a business} \end{cases}$$

Now, we want to solve for the high-dimensional line (a.k.a. a hyperplane) that best separates the two classes in our nonlinear space (determined by $\phi$). The hyperplane is defined by a vector w, and displacement b; these are the variables we solve for during training. The problem is mathematically stated as follows:

$$\operatorname*{argmin}_{w,b} J(w, b, x) = \|w\|_2^2 + \frac{\lambda}{N} \sum_{i=1}^{N} (y_i - [w^T \phi(x_i) + b]),$$

where N is the number of clients used to train the classifier, and $\lambda > 0$. The first term, $\|w\|_2^2$ has a few alternatives, although this one is designed to be less computationally taxing that others. The second term is a sum of squared errors. That is, inside the parentheses, it is computing the difference between the label for the $i^{th}$ client, $y_i$, and the projection of the feature vector $x_i$ onto the line defined by w and b. By minimizing the values in w and b, we are searching for the line that "best" separates the classes. Solutions to this problem are well studied, with one solution given by $$w = \sum_{j=1}^{N} \alpha_j \phi(x_i),$$

$$a = S^{-1}\left(I_N - \frac{1_N 1_N^T S^{-1}}{1_N^T S^{-1} 1_N}\right) y = S^{-1}(y - b 1_N)$$

$$b = \frac{1_N^T S^{-1} y}{1_N^T S^{-1} 1_N}$$

$$1_N = [1, 1, \dots, 1]^T$$

$$S = K + \frac{N}{\lambda} I_N$$

$$K = \{\phi(x_i)^T \phi(x_j)\}_{i,j=1}^{N},$$

where K is the "kernel matrix", and $I_N$ is the identity matrix of size N (i.e., zeros everywhere except on the diagonal, which is all ones). Now, when a new client x is to be analyzed, it is processed with the "decision function":

$g(x) = w^T \phi(x) + b = \alpha^T \phi(x)^T \phi(x) + b = \alpha^T k(x) + b.$

When g(x) is below a certain threshold it belongs to the consumer class, otherwise, it belongs to the business class (of course it is arbitrary; if you set the business class label to be −1 and the consumer label to be 1, in which case g makes the opposite conclusion).

A typical function for kernel $\phi$ is the Gaussian radial basis $$[\phi(x)]_k = \exp\left(-\frac{x_k}{2\sigma^2}\right),$$

Type equation here. where $x_k$ is the $k^{th}$ feature, but many others can be found in various resources. See the Zhenyu Reference for more details on this classifier and the derivation of the solution to its cost function minimization.

Neural Networks—Methods of training neural networks vary depending on the specific type of neural net (convolutional, recurrent, etc.). The basis process of training a neural net is similar to that described in the SVM section: an objective function is minimized or maximized and contains two terms: (1) a constraint on the weights w and (2) a data-fidelity term, making sure that the classifier incorporates previous clients' labels.

The weights are then used directly to specify a "decision function" (like g(x) in the SVM section). The important thing to consider in neural networks is that there is a node in the final layer for each possible classification (just two for the consumer/business problem, but one for each VC in the industry/vendor classification problem).

Validation: In all the above methods, it's important to validate and test the classifier. There are various approaches to this, with the main concepts being (1) use most of the database for training every time; (2) save a chunk for "validation"—that is, after designing a classifier, try to classify the validation client as well, then refine the classifier based on those results; (3) save some known clients for "testing" which should never be incorporated into the classifier, as an independent measure of the classifier's ability.

Regarding embodiment two, industry classification, the goal of this problem is to automatically extrapolate the existing database of labeled industries using only the transaction history of a new client. Our approach is the same as in Embodiment 1, but using different labels and data. There are just a few distinctive remarks to make:

Features: It is possible that only a subsection of the Feature list in Embodiment 2 should be considered for this problem. In particular, Features 9 and on (statistics on frequencies and VC proportions) may be more predictive than the first 8 (which are based on the statistics of purchase amounts). On the other hand, feature selection can usually be done automatically.

Dimensionality Reduction: LFM could be a great tool for this problem, as well. One or two exemplary clients should be chosen from each industry category.

Training/ML algorithms: Another consideration is which ML approaches are suitable for this problem. SVM's are inherently binary classifiers (deciding between two classes only), but some multi-class extensions have been proposed in literature. Another consideration is to build many distinct binary classifiers-one for each class that decides simply whether a given client is in the class. This is particularly relevant if a client could be a member of multiple industries simultaneously (i.e., they are not mutually exclusive classes).

Thus, to summarize, the method described herein basically makes a classification based on some highly nonlinear weighted combinations of these features. In other words, it combines the features numerically in a convoluted way to reach its conclusion. The concept is that classification embodiment one (identification of small business vs consumer) and embodiment two (identification of industry) can probably be addressed using different nonlinear weighted combinations of the same features. Thus, first a classifier is made that decides consumer vs business, and then a separate classifier that decides which industry a client (also referred to as user) is involved in.

Figure 5:
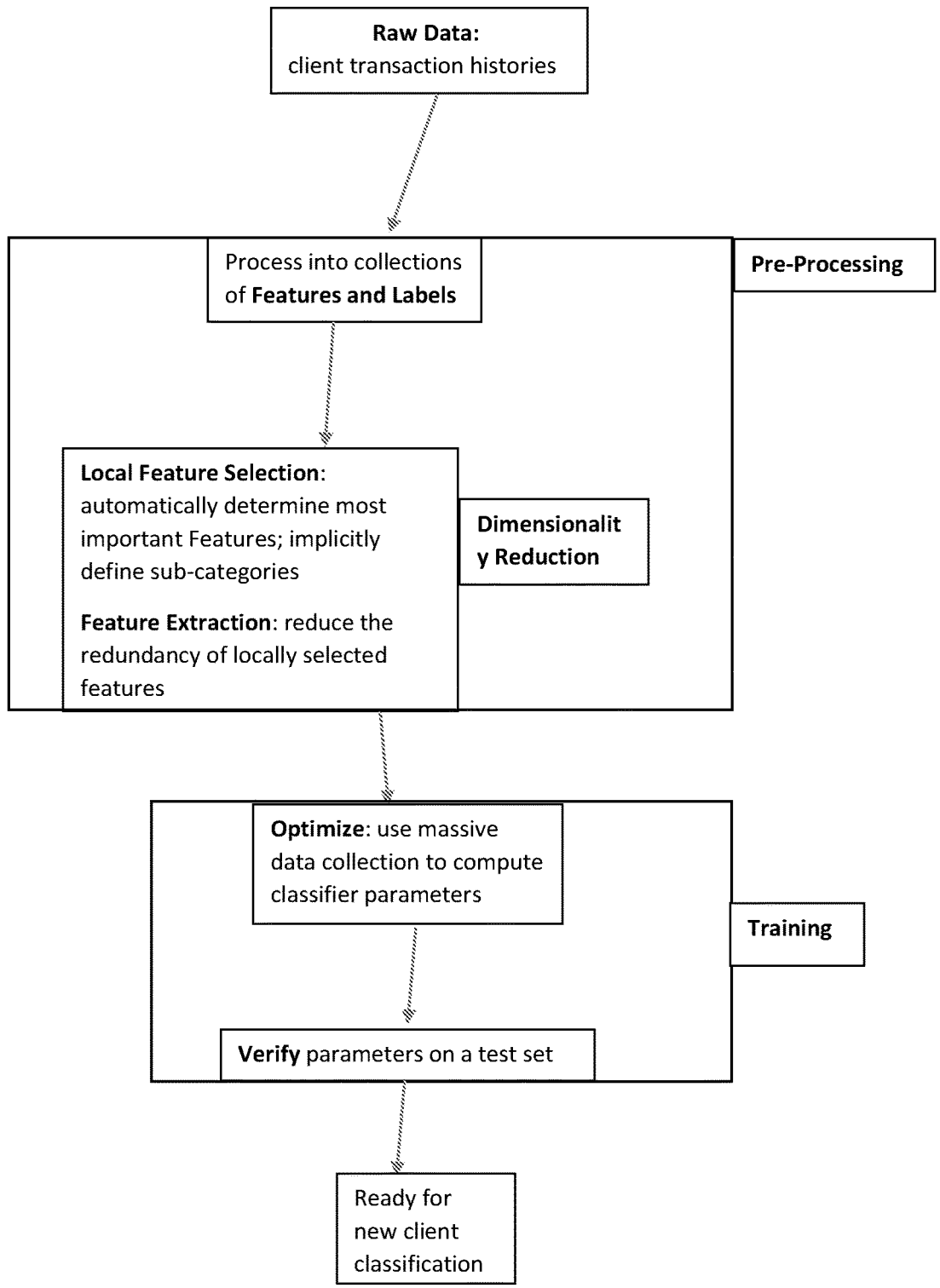
FIG. 5 is a flowchart illustrating the pre-processing and training of data, according to an embodiment.

FIG. 5 is a flowchart illustrating the pre-processing and training of data, according to an embodiment. First, the raw data (the transaction histories of the users/clients) is input into the pre-processing operations (as described herein). This is then used by the training (as described herein) which is then ready for the new client (also referred to as user) classifications.

Figure 6:
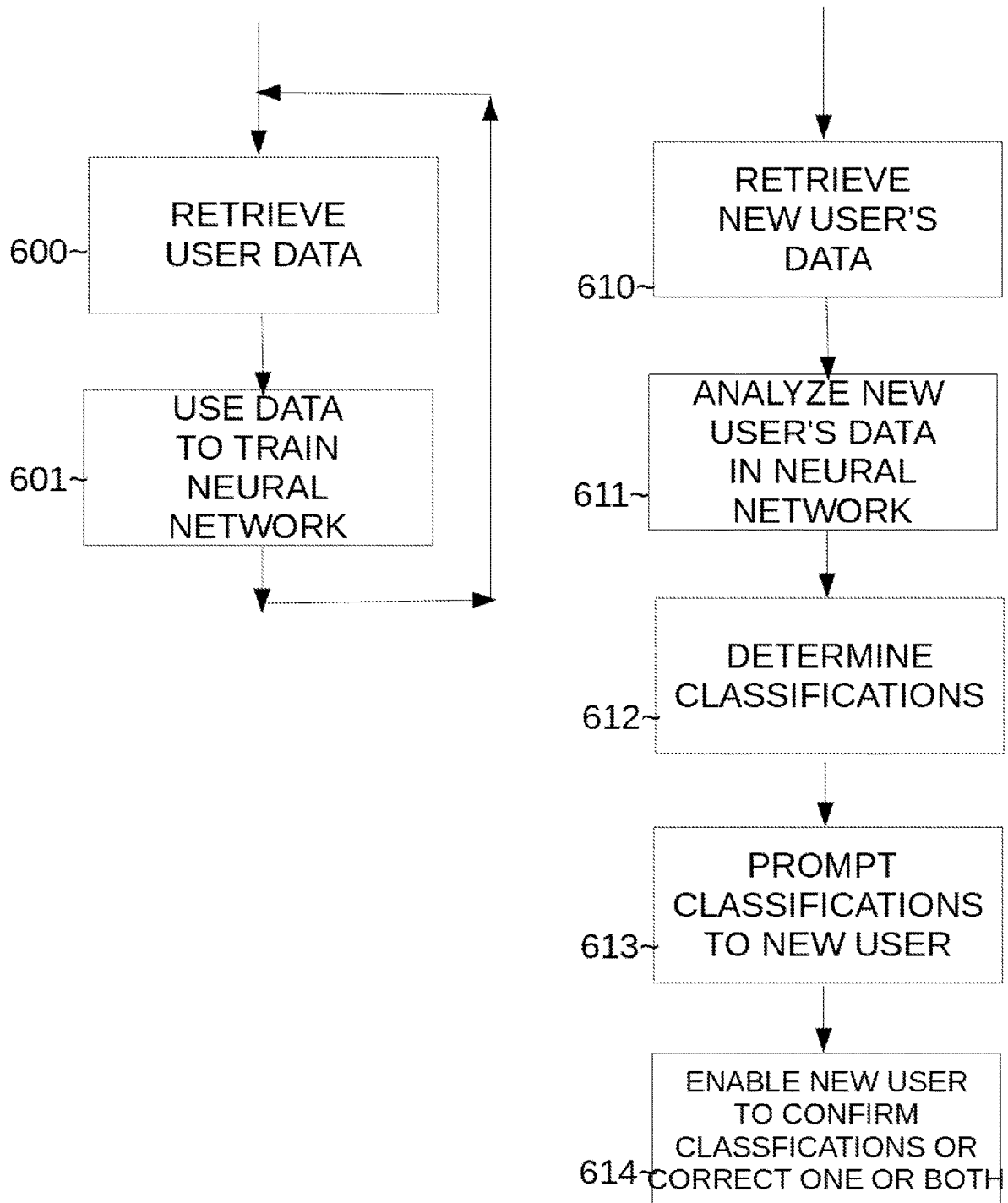
FIG. 6 is a flowchart illustrating an exemplary method of utilizing machine learning to automatically classify items, according to an embodiment.

FIG. 6 is a flowchart illustrating an exemplary method of utilizing machine learning to automatically classify items, according to an embodiment. Operations 500-501 are utilized to train the neural network and can be executed on a continuous basis to improve the training of the network.

The method can begin with operation 600, which retrieves user data from a database. This can be past transaction data, profile data (data that is already known about each particular user, such as their occupation, category of business (individual or small business), address, etc.) The system could know the profile data from a questionnaire that each respective user may have answered at an earlier point in time. All of this user data can be considered "historical data" since it is data already known.

From operation 600, the method proceeds to operation 601, which utilizes the user data from operation 600 (the historical data) to train the neural network. The training can be done as described herein.

Operation 610 to 612 are directed to utilizing the neural network to automatically determine classifications.

In operation 610, the system retrieves a new user's data. This can be financial data scraped from the user's financial accounts (e.g., at their banks, etc.) Note that at this point the system does not know the industry the new user is in as well as whether if the new user is an individual or a small business.

From operation 610, the method proceeds to operation 611, which analyzes the new user's data retrieved in operation 610 using the trained neural network (in operation 501) using the methods described herein.

From operation 611, the method proceeds to operation 612, which based upon the analysis in operation 611, determines the classifications (e.g., what industry the user is in and whether he/she is a small business or individual).

From operation 612, the method proceeds to operation 613, which prompts the new user whether the classifications are correct or not.

From operation 613, the methods proceeds to operation 614, which enables the new user to confirm which of the two automatically determined classifications are correct and enable the user to correct either one (or both) of they are incorrect and enter the correct classification. The computer the new user is using displays the two predicted classifications. The new user can accept both as correct, or correct either one or both as needed and then continue. The correct classifications are then stored in a record in a user database associated with the new user.

FIG. 7 is an example output illustrating prompting a new user whether determined classifications are correct.

Displayed is a screen which shows the predictions of: whether the account owner is an individual or a small business, and what industry the account owner is in. The user has the opportunity to confirm that both predictions are correct (by pressing a continue button without making any other changes) or can correct one or both predictions and then press continue to designate the user's actual category for both classifications. The correct classifications are now saved in the database so that all further calculations relating to this user will utilize the correct classifications.

Note that an account as used herein is not limited to a financial account (e.g., bank account, credit card account, PAYPAL account, etc.) but can be any account that a consumer (also referred to herein as an individual) or small business might use (e.g., shipping, accounting, social networking, etc.) The methods described herein can be applied to any such account(s).

Figure 8:
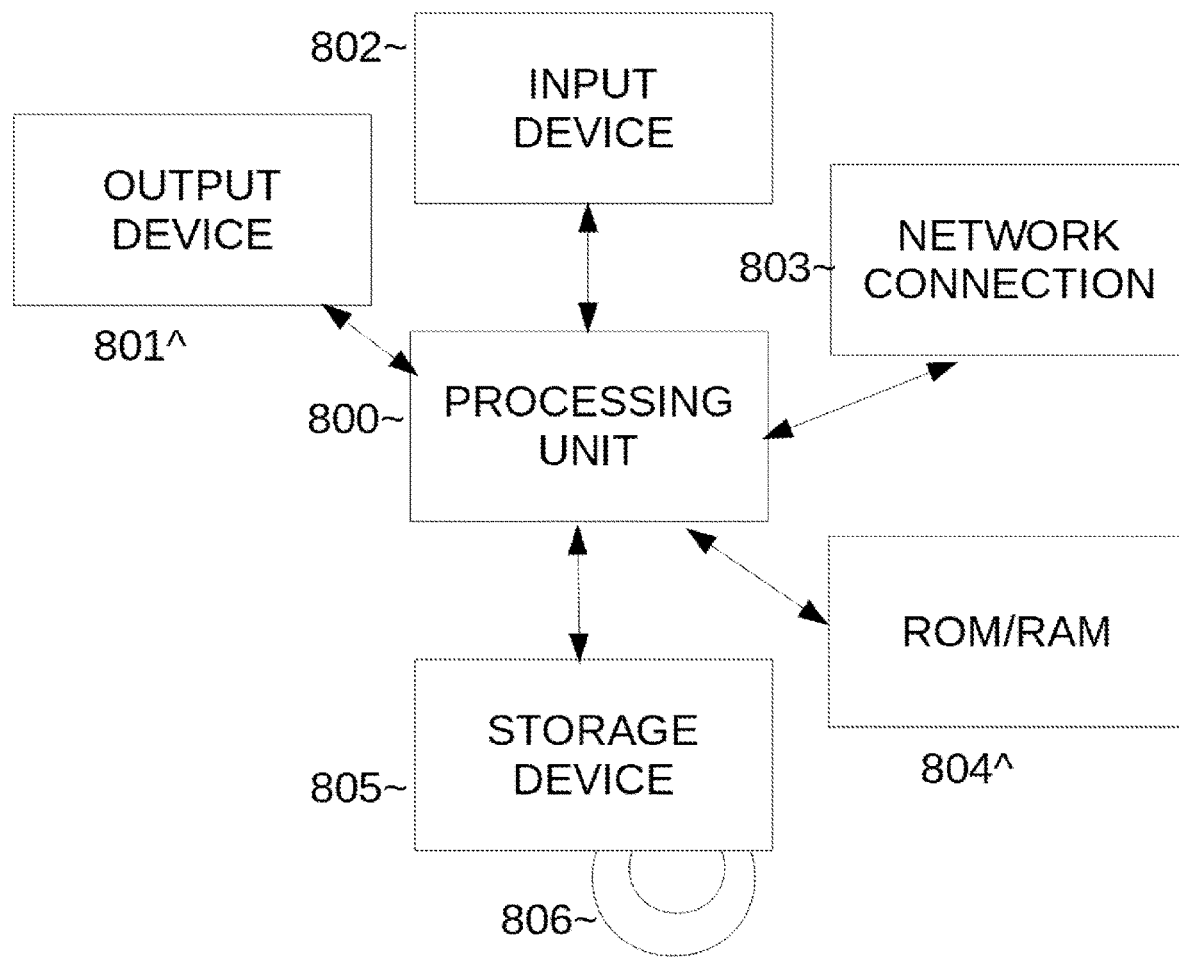
FIG. 8 is a block diagram illustrating exemplary hardware that can be utilized to implement the inventive concepts described herein, according to an embodiment.

FIG. 8 is a block diagram illustrating exemplary hardware that can be utilized to implement the inventive concepts described herein, according to an embodiment.

A processing unit 800 (which can be a microprocessor and any associated structure such as bus, power supply, etc.) is connected to an output device 801 (e.g., LCD display, etc.) one or more input devices 802 (e.g., mouse, keyboard, etc.), a network connection 803 (e.g., Wi-Fi connection to the Internet, LAN, etc.), a ROM/RAM 804 and a storage device 805 which can read a non-transitory computer readable storage medium 806 (e.g., CD-ROM, EPROM, flash memory, hard disc, etc.). A computer program comprising computer readable instructions can be programmed and stored on the computer readable storage medium 806 (and/or the ROM or RAM or any other storage device) to implement any of the methods/features described herein. While one processing unit 800 is shown, it can be appreciated that multiple such processing units can cooperate to implement any of the methods/features described herein, and such processing units can be in the same physical location or different physical locations connected via a computer communications network such as the Internet. Note that the network connection 803 can connect the processing unit 800 to any database which can store any information described or needed herein, such as any and all of the financial transactions. Such database(s) can be located in the same physical location as the processing unit 800 or different physical locations.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. A method, comprising:
    processing, by at least one electronic processor, financial transaction data stored in a database into features for a plurality of vendor classifications, wherein the processing comprises generating a set of feature vectors for each vendor classification among the plurality of vendor classifications via execution of a local feature selection algorithm;
    training a neural network utilizing the features for the plurality of vendor classifications;
    retrieving the processed financial transaction data for a particular user;
    identifying classifications of the particular user, wherein the identifying is performed by the neural network;
    displaying the classifications of the particular user and receiving feedback from the particular user; and
    further training the neural network using the feedback.

2. The method as recited in claim 1, wherein the training comprises training the neural network to determine whether the particular user is a small business or a consumer.

3. The method as recited in claim 1, wherein the training considers where each of the plurality of users spends their money.

4. The method as recited in claim 1, wherein the feedback comprises a choice to confirm the classifications as correct, and a choice for correcting the classifications.

5. The method as recited in claim 1, wherein an industry of the particular user is determined using the financial transaction data retrieved for the particular user.

6. The method as recited in claim 1, wherein the classifications comprise an identifier selected from a set comprising small business and consumer.

7. The method as recited in claim 1, wherein the training further comprises applying a frequency analysis to the financial transaction data.

8. The method as recited in claim 1, wherein the training further comprises utilizing normalized frequency peaks.

9. The method as recited in claim 1, wherein the training further comprises utilizing seasonal spending frequencies.

10. The method as recited in claim 1, wherein the training further comprises utilizing a decision tree.

11. An apparatus, comprising:
    at least one non-transitory computer readable storage medium storing computer readable instructions;
    at least one electronic processor configured to read and execute the computer readable instructions from the at least one non-transitory computer readable storage medium, the computer readable instructions configured to, when executed, cause the at least one electronic processor to:
    access a database of financial transaction data for a plurality of users;
    process the financial transaction data into features for a plurality of vendor classifications, wherein the processing comprises generating a set of feature vectors for each vendor classification among the plurality of vendor classifications via execution of a local feature selection algorithm;
    train a neural network utilizing the features for the plurality of vendor classifications;
    retrieve financial transaction data for a particular user;
    identify classifications of the particular user, the identify is performed by the neural network;
    display the classifications of the particular user and receiving feedback from the particular user; and
    further training the neural network using the feedback.

12. The apparatus as recited in claim 11, wherein the computer readable instructions are further configured such that the training comprises training the neural network to determine whether the particular user is a small business or a consumer.

13. The apparatus as recited in claim 11, wherein the computer readable instructions are further configured such that the training considers where each of the plurality of users spends their money.

14. The apparatus as recited in claim 11, wherein the computer readable instructions are further configured such that the feedback comprises a choice to confirm the classifications as correct and a choice for correcting the classifications.

15. The apparatus as recited in claim 11, wherein the computer readable instructions are further configured such that and an industry of the particular user is determined using the financial transaction data retrieved for the particular user.

16. The apparatus as recited in claim 11, wherein the computer readable instructions are further configured such that the classifications comprise an identifier selected from a set comprising small business and consumer.

17. The apparatus as recited in claim 11, wherein the computer readable instructions are further configured such that the train operation further comprises applying a frequency analysis to the financial transaction data.

18. The apparatus as recited in claim 11, wherein the computer readable instructions are further configured such that the train operation further comprises utilizing normalized frequency peaks.

19. The apparatus as recited in claim 11, wherein the computer readable instructions are further configured such that the train operation further comprises utilizing seasonal spending frequencies.

20. A non-transitory computer readable medium storing program instructions, which upon execution of the program instructions by one or more electronic processors, causes the one or more electronic processors to perform the operations of:
    accessing a database of financial transaction data for a plurality of users;
    processing the financial transaction data into features for a plurality of vendor classifications, wherein the processing comprises generating a set of feature vectors for each vendor classification among the plurality of vendor classifications via execution of a local feature selection algorithm;
    training a neural network utilizing the features for the plurality of vendor classifications;
    retrieving financial transaction data for a particular user;
    identifying classifications of the particular user, the identifying is performed by the neural network;

displaying the classifications of the particular user and receiving feedback from the particular user; and
further training the neural network using the feedback.

\* \* \* \* \*